United States Patent [19]

Freeman

[11] Patent Number: 5,213,510
[45] Date of Patent: May 25, 1993

[54] REAL-TIME INTERACTIVE CONVERSATIONAL TOY

[76] Inventor: Michael J. Freeman, Ste. 2401, 1270 Avenue of the Americas, New York, N.Y. 10020

[21] Appl. No.: 727,836

[22] Filed: Jul. 9, 1991

[51] Int. Cl.[5] ............................................. G09B 7/06
[52] U.S. Cl. ..................................... 434/321; 434/319
[58] Field of Search ............... 434/307, 308, 309, 318, 434/319, 321, 322, 323, 335; 273/436; 446/297, 299, 302

[56] References Cited

U.S. PATENT DOCUMENTS

| | | | |
|---|---|---|---|
| 3,735,503 | 5/1973 | Dow et al. | 434/321 |
| 3,947,972 | 4/1976 | Freeman | 434/321 |
| 4,078,316 | 3/1978 | Freeman | 434/319 |
| 4,117,605 | 10/1978 | Kurland et al. | 434/319 |
| 4,170,832 | 10/1979 | Zimmerman | 434/323 |
| 4,445,187 | 4/1984 | Best | 434/323 |
| 4,571,640 | 2/1986 | Baer | 434/307 |
| 4,753,597 | 6/1988 | Pash et al. | 434/318 |
| 4,847,699 | 7/1989 | Freeman | 434/307 |

OTHER PUBLICATIONS

Usami, Shozo, "Parallel Random Access System" Educational Technology, Feb. 1979 pp. 33-35.

*Primary Examiner*—Jessica J. Harrison
*Attorney, Agent, or Firm*—Bryan Cave

[57] ABSTRACT

The present invention is a real-time interactive conversational toy which operates by playing to a child a prerecorded conversation stored on a multi-track media such as magnetic tape. The system conversations are programmed according to a decision-tree logic which allows complex conversations to be developed, branching between the various tracks of the media being accomplished without the aid of a microprocessor or any coding in the conversation source signal. The information is stored on each track in a plurality of reproducible information segments, which contain interrogatory messages and associated multiple choice responses, responsive messages, informational messages, and combinations thereof. The responsive messages contained on the tracks are related in real-time and content to particular interrogatory messages, and correspond with multiple choice selectable responses. The system can exhibit pseudo-memory and multiple simultaneous pseudo-memories; exhibit profiling and substitutability; and categorize and subcategorize users of the toy. The media used by the toy are removable so as to allow user selection of cartridges containing differing conversational content.

8 Claims, 4 Drawing Sheets

REAL-TIME INTERACTIVE CONVERSATIONAL TOY

BACKGROUND OF THE INVENTION

1. Field of the Invention

The present invention relates generally to interactive toy systems, and more particularly to a real-time interactive conversational toy which exhibits pseudo-memory of conversation responses for improved dialogue complexity and more realistic performance.

2. Description of the Prior Art

Systems which perform interactive conversation are well known in the art. These systems have used a variety of different techniques to achieve interactive conversation, and have ordinarily had limited success at conversations which were more than mere simple question and answer sessions.

For example, commonly owned, U.S. Pat. No. 3,947,972 discloses a conversational teaching apparatus which employs a time synchronized multi-track audio tape to store the educational conversation messages. It employs one track to relay educational interrogatories to a user, and the remainder of the tracks, selectable by a switching mechanism, are used to convey responsive messages.

Other multiple choice child response systems are exemplified by the systems disclosed in U.S. Pat. Nos. 2,921,385; 3,020,360; 2,826,828; 3,623,238; 3,546,791; 3,273,260; 3,665,615; 3,245,157; 3,284,923; 3,538,621; 3,477,144; 3,708,891; 3,255,536; 2,777,901; 2,908,767; 3,774,316; 3,194,895; 3,484,950; 3,343,280; and 3,763,577, by way of example.

Various interactive television systems have also been developed. For example, commonly owned U.S. Pat. No. 4,264,925 discloses an interactive cable television system. This system permits computer based memory of user input responses over time, and requires a very complex and expensive apparatus to operate. Other examples of interactive conversation utilizing television may be found in U.S. Pat. Nos. 4,602,279; 4,847,700; and 4,264,924, for example. Generally, these systems require a separate microprocessor to perform memory functions, they require coding and decoding of the transmitted signal in order to be utilized, and allow little flexibility to select the content of the interactive conversations, since the conversation signal is broadcast separately from outside of the control of the user.

Flexibility and memory-like characteristics are desirable elements for an interactive toy system to participate in a complex interactive conversation. None of these prior art systems have been able to provide real-time interactive conversation in a toy, where the conversation complexity and teaching effectiveness can vary with the individualized past responses of the child. Further, without a separate microprocessor, prior systems have been generally unable to exhibit the memory-like characteristics which are necessary for a realistic interactive conversation. Those which do provide memory, do so in only the most minimal fashion, i.e. recalling particular facts, but unable to integrate these facts into the course of conversation.

Prior conversational devices are generally impractical for utilization as toys for children. Those systems which operate on magnetic tapes offer little conversational complexity because they are generally restricted to keeping all interrogatories on a single track. They are not interactive enough to retain the long-term motivational and educational interests of a child, and are therefore not the most effective learning tools. Cable and broadcast television systems ordinarily require very complex and expensive apparatus and a dedicated television signal, while delivering relatively minimal conversational complexity. Since the media used for transmitting the conversation is out of the control of the user (i.e. the program is shown at a scheduled time), rather than one which is removable and replaceable, the cable systems also offer little user flexibility in the content and scheduling of interactive conversation available to participate in.

These disadvantages of the prior art are overcome by the present invention.

SUMMARY OF THE INVENTION

The present invention is a real-time interactive conversational toy which operates by playing to a child a prerecorded conversation stored on a multi-track media such as magnetic tape. Contained on the various tracks of the media are a series of related questions, answers and informative messages which are recorded in a pre-synchronized manner. In response to questions, the child switches between the tracks of the tape by activating a multiple choice switch which corresponds with the multiple choice responses to the question. The track selected will contain a message corresponding in context with the child's multiple choice response to the interrogatories. Thus, the system of the present invention appears to be conversing with the child by asking questions, and then by apparently fostering discussion based upon the responses by the child.

The system may ask information gathering questions, such as age, sex, locality, and use this information to categorize the child. The system of the present invention may then engage the child in conversation with messages related to the child's category. The system can further subcategorize children, i.e. boy under 5 years old, and provide the subcategories each with real-time interactive conversation related to the subcategories. The flexibility of the system is limited only by the number of tracks available. By altering the content of the machine-child conversation in response to conversational inputs of child, the child is given the impression that the machine has memory and is participating in the conversation, and therefore provides a more realistic and enjoyable learning experience.

The system conversations are programmed according to a decision-tree logic which allows very complex conversations to be developed, all within the confines of a multi-track media, and without the aid of a microprocessor or any coding in the conversation source signal to control branching. As indicated above, the machine can engage in conversation particularly suited for a child based upon responses to informational questions. The system can also track trends in the child's performance in answering questions, and then provide reinforcement or encouragement to the child. Also in response to trends in the child's performance, the machine can ask easier or more difficult questions as necessary. All of the logic to perform these functions is determined in advance by the decision tree and recorded onto the entirely passive media.

By appropriate decision-tree design, the system can provide customized conversation to each of more than one child at a time. Each child may receive an individualized conversational response depending on the multiple choice selection made by the child in response to questions.

The interactive toy of the present invention comprises a multitrack storage media, preferably magnetic, having a plurality of synchronized co-extensive tracks capable of storing the conversational content. The system also includes a multi-track playback means, for simultaneously reproducing the stored information from each of the tracks; a multiple choice selection means, such as magnetic proximity switches or conventional push button switches, operatively connected to the playback means for directly selecting one of the tracks and playing back its stored information; and audio output means, such as a conventional loudspeaker or earphones, operatively connected to the playback means for producing as an output the track information selected by the multiple choice switching means. By including a plurality of multiple choice selection means, one per child, connected in parallel to the common playback means with each selection means having an associated output device, such as earphones, the system may be configured for use by a large number of children simultaneously, different children participating in individually tailored conversations simultaneously.

In operation, the multi-track storage media, which contains a conversational content as described below, has all of its tracks played back simultaneously by the playback means. In response to questions having multiple choice responses associated with particular tracks, a child will switch the multiple choice selection means to a particular track associated with the selection, thereby directing the information on the selected track to the output means. Thus, only a single selected channel will be output at a given time, the content of which is the interactive conversation.

The information is stored on each track in a plurality of reproducible information segments, each of which comprises a complete message reproducible by the playback head directly in response to the selection of the track upon which the segments are stored. Each of the information segments on the tracks contain interrogatory messages and associated multiple choice responses, responsive messages, informational messages, and combinations thereof. Each of the tracks are preferably of the same width. The responsive messages contained on the tracks are related in real-time and content to particular interrogatory messages, and correspond to the multiple choice selectable responses.

The media used by the toy of the present invention are removable by the user so as to allow user selection of cartridges containing differing conversational content to be removably inserted into the playback means. This feature permits the toy great flexibility by allowing a wide variety of conversations to be stored on a library of tapes for use by children. A variety of conversations will retain the long term interest of children, and increase the educational value of the present invention. The labels on the multiple choice selection buttons may also be changed and the system used in conjunction with an associated book containing pictures or text. These features add to the variety of uses which the system of the present invention may be used for.

The decision-tree architecture of the present invention allows complex, well-timed, cumulative conversations to be implemented on the storage media. Each track, at discrete times, is represented as a node on the tree, consecutive nodes representing a single track at different ordered times throughout the program. Parallel nodes represent the various tracks at each particular time. Branches on the tree represent the multiple choice selections to interrogatories which would cause the different tracks to be read, and require messages on the selected track to contain messages related to the particular multiple choice selection.

The decision-tree logic permits a visual verification of conversational parameters, to properly synchronize the interrelationships between successive segments of conversation, and to assure logical continuity between these segments. By seamlessly crossing between parallel tracks of predetermined conversation in response to multiple choice inputs, the system appears to be engaged in an actual conversation with the child. By appropriate design the system can exhibit pseudo-memory; exhibit multiple simultaneous pseudo-memories, carry the various memories throughout the program; engage in interactive conversations related to the content of the various pseudo-memories; categorize and subcategorize users of the toy and engage in particularized conversations with the various categories; can give reinforcing or encouraging messages in response to correct and incorrect answers; can correct children who did not follow instructions properly; do mathematics; make subsequent questions easier or more difficult in response to correct and incorrect answers; identify subject areas in which the child needs improvement and provide conversation accordingly, and many other possible alternatives.

The system of the present invention provides a more comprehensive interactive conversational toy than previously possible. Prior art designs of similar simplicity were incapable of conversations having the many features of the conversations of the present invention, especially tailored responses, long-term memory functions, cumulative memory functions, profiling, substitutability, and removable, replaceable media. The decision-tree design of the toy of the present invention makes the system directly responsive to conversational responses by the child, giving the child a more realistic impression that interactive conversation is occurring, and therefore improving its utility as a toy and as a teaching aid.

DESCRIPTION OF THE PREFERRED EMBODIMENT

Figure 1:
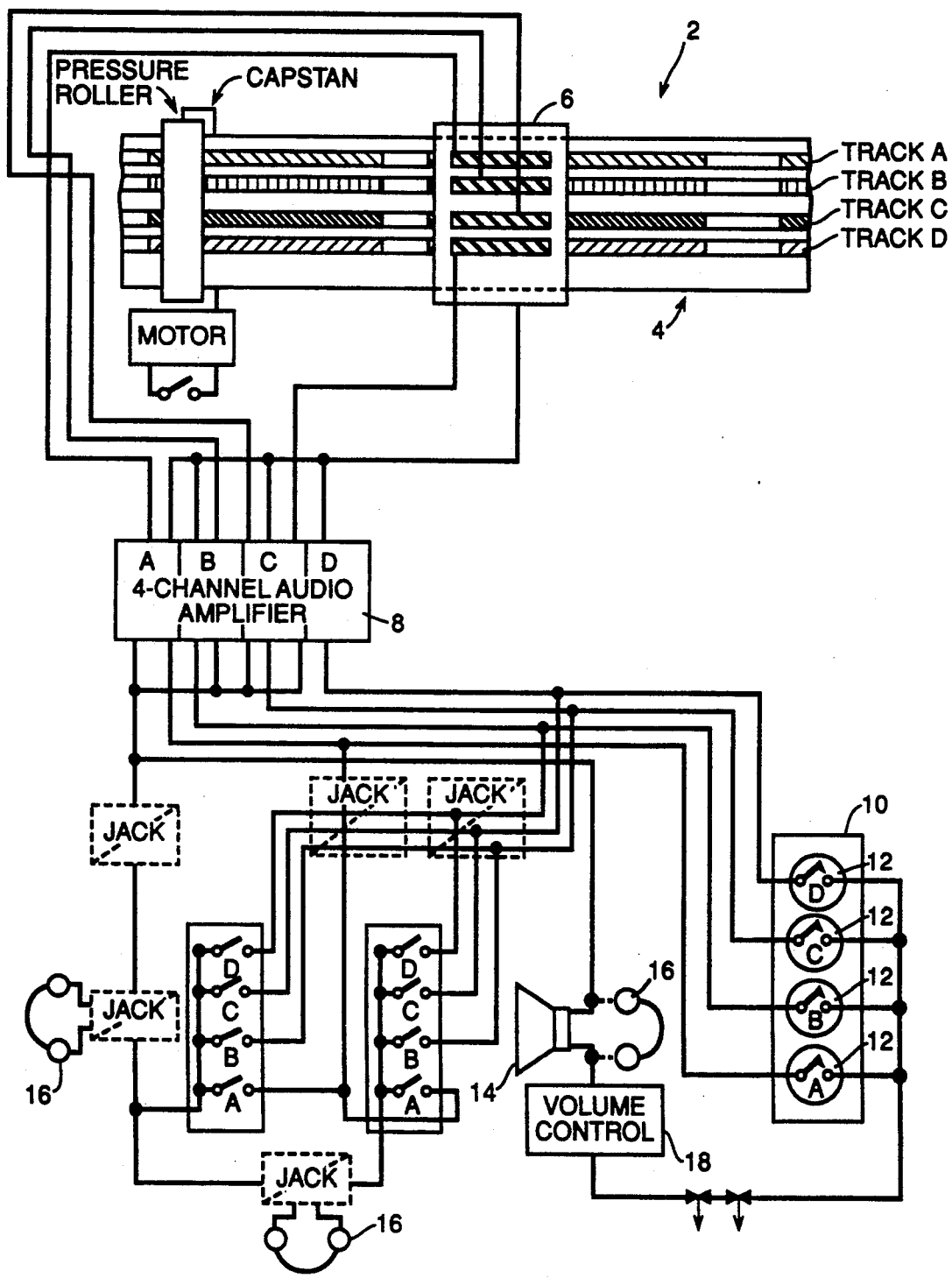
FIG. 1 is a diagrammatic illustration, partially in schematic, of the selection and playback portions of the interactive conversational toy of the present invention.

Referring now to the drawings in detail, and initially to FIG. 1, the mechanism of the real-time interactive conversational apparatus of the present invention is generally similar to that disclosed in commonly owned U.S. Pat. No. 3,947,972. A conventional multi-track magnetic tape player 2 is utilized for retrieving audio information from a multi-track magnetic storage media 4 via multi-track playback head 6.

The playback head 6 is preferably connected in conventional fashion to a conventional four channel audio amplifier 8, having one channel for each of the respective four tracks, A, B, C, D of multi-track tape 4 so as to conventionally playback the information stored on the respective audio tracks. Playback head 6 is preferably a conventional 4 channel audio playback head, with preferably equal head widths for each of the respective tracks A, B, C, D. If desired, four-channel amplifier 8 can be replaced with a single channel amplifier which is switched to amplify the actual track selected at any given time.

The output of audio amplifier 8 is preferably connected to a multiple choice selection device 10 which preferably comprises a plurality of conventional switches 12, with one switch being provided per track of multi-track tape 4. Each of these switches 12 is conventionally connected to the appropriate channel output of audio amplifier 8. The switches 12 are preferably conventional mechanical, magnetic or electronic switches which are equipped with an interlock so that only one switch may be depressed or activated at one time. Switches 12 are preferably connected between the output of the audio amplifier 8 and a conventional audio output device, such as a conventional speaker 14, or a conventional pair of earphones 16 through a conventional volume control 18, the other terminal of the audio output device 14 or 16 being connected to the audio amplifier 8 to complete the circuit. Thus, when one of switches 12 is closed, the output of the corresponding audio track A, B, C or D, all of which are being provided to audio amplifier 8 by multi-track playback head 6, is selectively provided to the audio output device 14 or 16 to be heard by the child. Accordingly, as described in greater detail hereinafter, if interrogatory messages, such as true/false or multiple choice questions with information instructions to the child to select the appropriate responsive message track A, B, C, or D are contained on any of the tracks A, B, C, or D of multi-track tape 4, and the student determines that track D contains the correct answer, he then actuates the switch 12 corresponding with track D to complete the circuit between the D channel of audio amplifier 8 and the audio output device 14 or 16 and he will receive the audio response messages contained on track D. If desired, the toy of the present invention may be simultaneously utilized by a plurality of children if configured as disclosed in commonly owned U.S. Pat. No. 3,947,972.

The multi-track tape 4 is preferably removable from the playback means 2 so that different multi-track tapes 4 having different interactive conversations stored thereon may be inserted and used in the toy of the present invention. This makes it possible to record a library of prerecorded media, covering a wide array of topics. For example, as described below, the media might contain mathematics problems at different levels, multiple choice trivia questions, learning exercises, or even interactive story telling. The removable media are preferably multi-track magnetic tape cartridges, but may be any removable multi-track media such as, for example, magnetic disk, optical disk, or other media appropriate for the present application. These removable multi-track tapes should preferably be contained in rigid cartridges for convenient removal and replacement.

The toy system of the present invention may comprise other embodiments. Rather than utilizing a multi-track magnetic tape, without any microprocessor, the system might use any appropriate data storage means for containing the various conversational messages employed by the system, provided that the information stored thereon may be separated into tracks. For example, a conventional magnetic disk, CD or other optical disk, or even hardware, such as a ROM or EPROM, could be used to store the information. The information data could be physically stored on individual disk tracks, or the data could be organized so that each track of information is randomly accessible as separable files on the disk. In conjunction with a disk reader appropriate for the type of disk drive in use, the information stored on the disk as individual conversational tracks could be output to a user of the system in near real-time fashion.

In practice, in such an instance, it would be advantageous for a microprocessor to be provided for the purpose of first reading the various tracks into a memory cache, which would allow faster access to the conversational information. Thus, during operation in this instance, the microprocessor would read the serial track information from the disk into parallel tracks in cache memory in advance, while substantially simultaneously reading the track data from cache to memory to an output device. As the cache memory were depleted, it would be refilled from disk by the processor. The microprocessor would only be used in this instance to control the various peripheral devices of the system, i.e. the multiple choice selection means, disk access, video output. As hereinafter described, the present invention exhibits a pseudo-memory during the interactive conversations. The microprocessor in the above example, is not used to perform any of the logical memory functions within a conversation, but rather these are achieved as in the previous embodiment by the unique techniques for storage information on the multi-track storage media as described below.

Output to the user could be by various devices, depending on the type of media used. For example, if the stored conversations on the multi-track media were in digital form, i.e. CD-ROM, magnetic disc, DAT, the processor or other means could convert the digital information streams to analog signals for output to conventional headphones. Alternatively, the conversational stream could contain video as well as audio signals. The computer would therefore generate the appropriate video and audio signals. It is anticipated that the interactive toy system of the present invention could employ a large variety of multi-media inputs and outputs as such technologies develop. It is further anticipated that any storage means capable of storing and substantially simultaneously retrieving conversational data could be employed by the present invention. Whatever multi-track device is employed, it should preferably contain one track for each of the number of tracks to be used in the interactive conversation. In a preferred embodiment, four equal bandwidth tracks are used. As described below, it may be advantageous to utilize a larger number of tracks to obtain more complex conversations and to exhibit more sophisticated memory type functions.

Multiple choice input may be provided by any appropriate device to select a channel of the conversation for output. If a microprocessor and computer were in use, the multiple choice inputs could be provided via a keyboard or even a touch screen that interrupts to the processor. The selected channel would then be routed to the output device in use. For example, a conventional computer could be used for the present invention. The information streams might be interlaced video and audio signals, the multiple choice input might be the keys on the keyboard, and output would be simultaneous to the monitor and audio amplifier.

If it were desired that the system be usable by only one child at a time, the four channel audio amplifier could be replaced by a conventional one channel amplifier which amplifies only the one selected channel. As described below, it might also be desired to allow more than one multiple choice selection button to be pressed at one time to allow mixing of the information on the various channels. Such an embodiment would, for example, allow the toy of the present invention to create different variations of a piece of music in response to various multiple choice selections of the child.

The information is stored on each track in a plurality of reproducible information segments, each of which comprises a complete message reproducible by the playback head directly in response to the selection of the track upon which the segments are stored. Each of the information segments on the various tracks contain interrogatory messages with associated multiple choice responses, responsive messages, informational messages, or combinations thereof. The messages contained on the various tracks of the multi-track media may include responsive messages, informational messages, interrogatory messages or combination thereof whose contents are related in real-time to particular interrogatory messages, and correspond to the multiple choice selectable responses to the particular interrogatory messages.

The various information segments on the various tracks relate in real-time and content so that an interactive conversation can occur as the media is played back and the child responds to the various interrogatories on the tracks. As a child answers a particular interrogatory with a multiple choice response, the information on the track associated with the particular selection is routed to the output device. On the selected track at the time at which the selection occurred, is an information segment whose content corresponds with the selected response to the previous interrogatory, whether or not the interrogatory was on the same track as the information segment being output. The various interrogatories, responsive messages, and informational messages may generally be contained on any or all of the various tracks provided that they are synchronized properly so as to retain a timed relationship, and correspond properly with logic of the decision-tree a defined hereinafter.

In order to understand the real-time conversational responsive environment of the present invention, and to compare it to prior systems of limited conversational complexity, several sample real-time interactive conversations are illustrated below.

Example 1 illustrates an interactive conversation which will give a child a reward if three questions in a row are answered correctly. In this example, a four channel media is used, and the multiple choice response buttons would be labelled "A", "B", "C", and "D" corresponding with the four channels 1, 2, 3 and 4. Thus, if multiple choice selection "C" were made, the contents of channel 3 would be output to the output device. By using a combination of "generic wrongs" whose answers cannot be traced back to a particular response, and by limiting the number of directed choices, it is possible to control the sequence of questions in such a way as to address the child who answers all three questions correctly. At the conclusion of the first question, every response is specific, and may be traced to a particular response. None of the answers is generic. At the conclusion of the second question, the answers are both specific and have perfect memory of the results of first two questions. After the final question, three of the branches are generic wrongs, and one branch, channel 4 is reserved for the child who answered all three questions correctly. This logic could be extended to encompass four or more correct answers. Theoretically, it is limited only by the amount of available storage media.

EXAMPLE 1

| CHANNEL 1 "A" | CHANNEL 2 "B" | CHANNEL 3 "C" | CHANNEL 4 "D" |
|---|---|---|---|
| I will now ask you 3 animal questions in a row. If you answer all 3 questions correctly, I'll tell you a joke! Here we go ... What animal can make no sound at all? Press "A" for chicken, "B" for horse, "C" for giraffe, and "D" for tiger. Press now! | Same as Channel 1. | Same as Channel 1. | Same as Channel 1 |
| SELECTION TIME No, a chicken does make a sound, and it sounds like this: (SFX). The answer was giraffe. Question #2 is a true/false question: True or false - a penguin has wings but can not fly. Press "A" for true, and "B" for false. Do it now. | SELECTION TIME No, a horse does make a sound, and it sounds like this: (SFX). The answer was giraffe. Question #2 is a true/false question: True or false - a penguin has wings but can not fly. Press "A" for true, and "B" for false. Do it now, if you would. | SELECTION TIME Yes, you have pressed the correct button. Congratulations. A giraffe makes no sound. Good work. Question #2 is a true/false question: True or false - a penguin has wings but can not fly. Press "C" for true, and "D" for false. Do it now, if you would. | SELECTION TIME No, a tiger does make a sound, and it sounds like this: (SFX). The answer was giraffe. Question #2 is a true/false question: True or false - A penguin has wings but can not fly. Press "A" for true and "B" for false. Do it now, if you would. |
| SELECTION TIME I see you had trouble on this question, also. What a shame. Believe it or not, the statement I made earlier is true, | SELECTION TIME You did better on this second question. Your brain is starting to function well. It is true. Penguins can't fly. | SELECTION TIME You didn't do as well on this second question. The statement was true. Penguins can not fly. They do not | SELECTION TIME I am very impressed. You are right, and have answered 2 questions in a row correctly. One more correct |

-continued

EXAMPLE 1

| CHANNEL 1 "A" | CHANNEL 2 "B" | CHANNEL 3 "C" | CHANNEL 4 "D" |
|---|---|---|---|
| Penguins can't fly. | | even try. They know they'd just fall down. | answer and I'll give you a joke. |
| Here is your third and final question: What is the largest mammal? Press "A" for elephant, and "B" for a whale. Press now! | Same as Channel 1. | Same as Channel 1 | Here is your third and final question: What is the largest mammal? Press "C" for elephant, and "D" for a whale. Press now! |
| SELEC-TION TIME | SELEC-TION TIME | SELEC-TION TIME | SELEC-TION TIME |
| I'm sorry, but the answer was a whale, not an elephant. You did not get three questions in a row right, so you do not get a joke. Better luck next time. That last questions was tricky, because many people think whales are fish, because they live in the water. But whales are mammals. | You are correct, the answer is a whale. That is a very good answer, as most people forget that whales are mammals. Unfortunately, though, you did not get all three questions right, so you do not get a joke. I am sorry, but rules are rules. | I'm sorry, but the answer was a whale, not an elephant. It is too bad that you got this third question wrong after answering the first two animal questions correctly. I am afraid I can not tell you the joke, even though two out of three is not bad. | This is truly amazing: (SFX). You are right and not only that, you've answered all 3 animal questions correctly, so here is your joke: What happened to the duck who flew upside down? He quacked up! (Laughter) then he ate some cheese and quackers. (Laughter). |
| (END) | (END) | (END) | (END) |

While it appears to the child that the system is remembering the previous answers, the memory in use is more properly termed a pseudo-memory because nothing is actually being stored in memory. Rather, the branching logic used to develop the conversation included a logical pathway reserved for no incorrect answers. Therefore, messages along the pathway correspond in content with the fact that no incorrect answers were given. As long as the child's responses to the series of interrogatories corresponded with the reserved pathway, messages with a content that appeared to contain memory were played back.

A decision-tree is used to determine the proper logical relation between the various tracks and the various information segments contained thereon in order to implement pseudo-memory and other features which provide conversation complexity, and to assure proper timing and synchronization of the information. The decision-tree is a visual and logical representation of a complex conversation whereby it is possible to trace branching from track-to-track in response to interrogatories, and it is easier to provide customized messages to certain children responsive to the content of their responses to certain questions.

Figure 2:
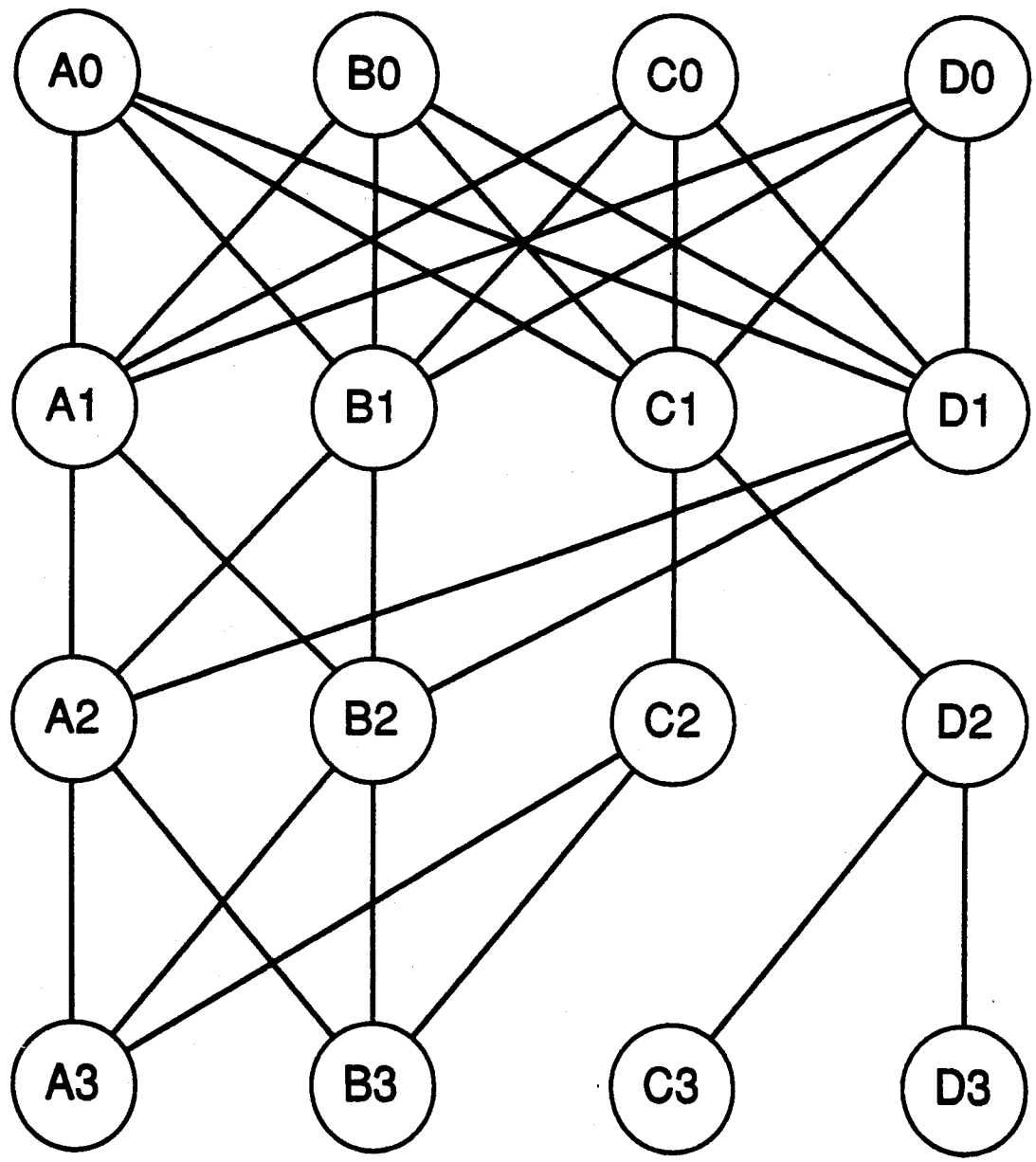
FIG. 2 is an illustration of the decision-tree corresponding with example 1.

Indicated in FIG. 2 is the decision-tree corresponding with example 1. The decision-tree contains a representation of each track at particular branch points during the course of a conversation. A branch point is ordinarily a time during the playing of the tape at which the child is asked to make a multiple choice selection. In example 1, branch points correspond with the segments reading "SELECTION TIME."

Each node on the tree represents the information segment on a particular track between branch points. Four nodes, A, B, C, D, are shown at each level, corresponding to the four tracks used in the example. Each node is represented at each branch point, the branches on the tree representing the multiple choice selections for each particular interrogatory. Each discrete time frame containing a different information segment is a different level on the tree. Each track contains successive nodes corresponding to the successive information segments of the conversation. The decision-tree is a useful visual tool for assuring proper synchronization of messages across the various tracks over time, as well as being a useful tool for assuring logical continuity.

Figure 3:
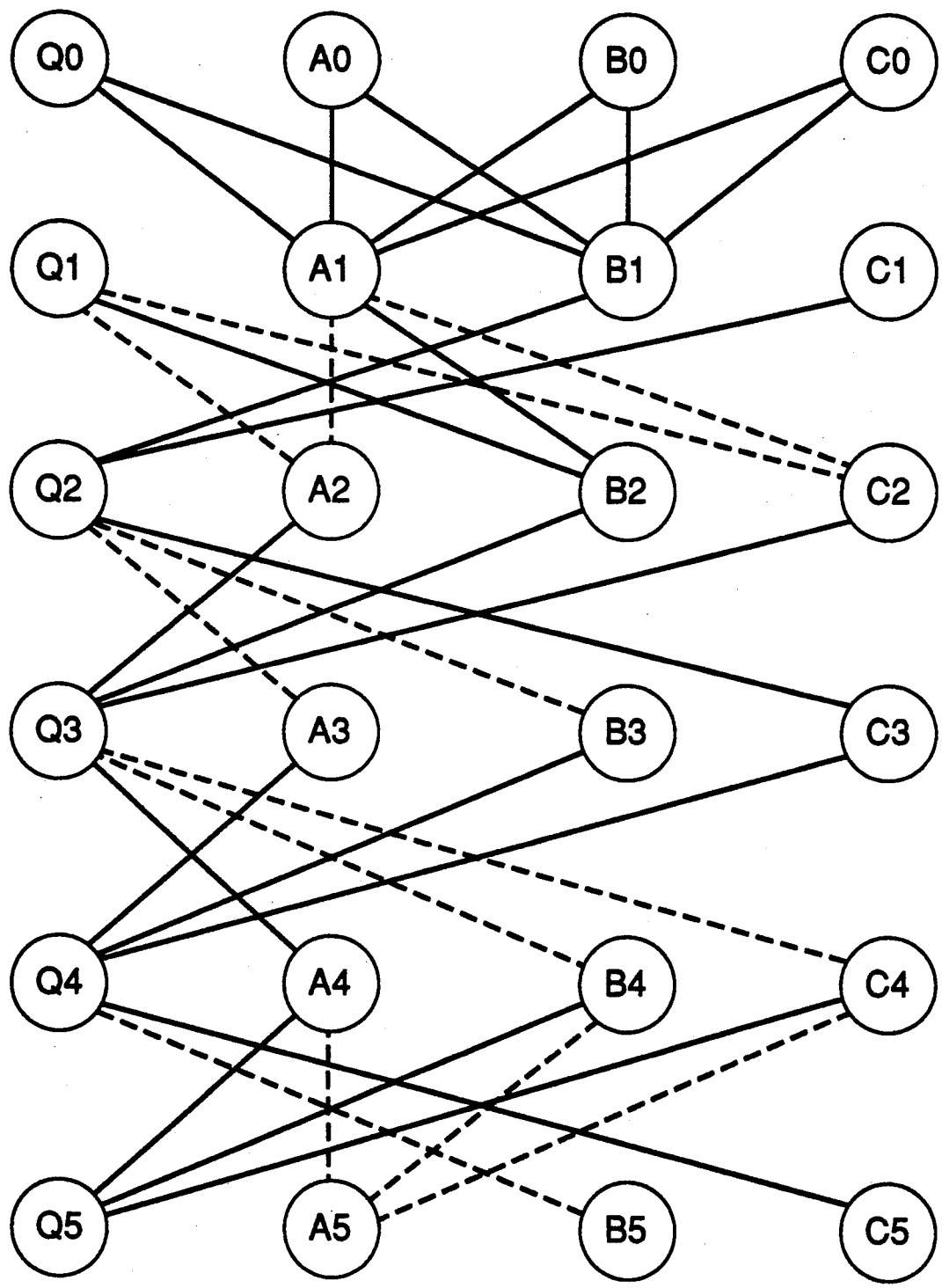
FIG. 3 is an illustration of the decision-tree corresponding with example 2.

Referring now to FIG. 3, four nodes A, B, C, D are shown at each level corresponding to the four tracks in the preferred embodiment. Each node is representative of the message contained on the corresponding track at the discrete time represented by the level number. Level 0 would represent the first message on each track, with subsequent levels 1, 2, and 3 representative of subsequently ordered frames. Each level of frames on the various tracks must be timed to begin and end at approximately the same time. If one frame were longer in time than others, it would be necessary to fill the gap in the remaining branches with filler messages. Filler messages may take any appropriate form, which may include music, a message telling the child to "Please Wait", or even a temporary quiet in the conversation. Not every track need have a branch point at the same time. Therefore it is possible that only a portion of the nodes will branch at a particular time.

The various branches from each node represent the possible selection choices offered to the child. Thus node A0 has branches to nodes A1, B1, C1, and D1 which correspond to the choices offered in example 1, channel 1, first message. In this example, choice C contains the correct response, therefore node C1 may include encouraging messages appropriate for a correct response. This node might also include a more difficult second question. Nodes A, B, and D, which represent incorrect answers might include encouraging messages, and perhaps easier questions. Messages such as given by example 1, second frame are indicative of such preferred language.

Since example 1 demonstrates use of the toy of the present invention for giving a child a reward for correctly answering 3 questions in a row, it becomes clear that only node C1 is on that pathway at level 1. Since there are only four nodes, the second question may only have two choices if separate pathways are to be maintained for persons who have only answered questions correctly and those with errors. Therefore, at level 2, nodes A and B are used for those children with incorrect answers, wrongs, and nodes C and D are reserved for child who answered the first question correctly. These nodes correspond with the multiple choices given to children in example 1, Frame 2. At level 3, only node D is reserved for children with no wrongs. Nodes A, B, and C remain reserved for children in the other category. By tracing the progression of the branches down the tree, all possible outcomes of a series of questions may be determined, and informational messages and responsive messages appropriate for their context may be recorded.

Any ordinary branches or series of consecutive branches are termed a pathway. Special pathways are used to distinguish series of branches which represent particular responses to particular interrogatories, and therefore contain at least one piece of pseudo-memory. Nodes on the special pathway might contain information demonstrating memory-like functions if desired. For FIG. 2, a special pathway exists along the path between nodes C1 - D2 - D3, since these exhibit full path recall. Other nodes exhibit certain recall functions as well. Node A2 can recall two wrong answers, but not the precise pathway, while node B2 corresponds with a wrong followed by a right answer, with no recallable pathway.

For example, if a point on the tapes corresponding to node B2 were to be played, this would indicate that the child received one incorrect answer followed by a correct one. Thus a message stressing improvement might be played. Since node A2 corresponds with two incorrect answers, words of encouragement might be recorded at this node. If desired, and if tracks were available, it might be desirable to provide persons at this node with easier questions.

The decision-tree provides a highly efficient method for planning complex conversations. The complexity of conversations which utilize multiple choice interrogatories is limited only by the number of tracks available. Once a piece of information is stored in the pseudo-memory, it requires only one channel to remain fully recallable. To then ask questions while maintaining the information will require a number of channels corresponding to the number of multiple choice selections to be made available. When no interrogatories are being given, each memory requires only one channel.

Example 2 demonstrates use of the system of the present invention for categorizing children based upon a response to a particular interrogatory, then providing the each category with independent tailored interactive conversation. In this example, the children are categorized by age, with children under 5 participating in an interactive conversation tailored for their age group, and children over 5 participating in a completely separate conversation.

EXAMPLE 2

| CHANNEL 1 "QUESTION" | CHANNEL 2 "A" | CHANNEL 3 "B" | CHANNEL 4 "C" |
|---|---|---|---|
| If you are under 5 years old, press A; if your are 5 years old or older, press button B. Press now! | Same as Channel 1 | Same as Channel 1 | Same as Channel 1 |
| SELECTION TIME You made a mistake. I guess you're under 5. Here is a special | SELECTION TIME Thank you. I now know you are under 5 years old. Here is a | SELECTION TIME THANK YOU. I'M PLEASED TO KNOW YOU'RE 5 OR OLDER. YOU MUST BE IN | SELECTION TIME I DIDN'T TELL YOU TO PUSH THIS BUTTON, SO I'LL AS- |

-continued
EXAMPLE 2

| CHANNEL 1 "QUESTION" | CHANNEL 2 "A" | CHANNEL 3 "B" | CHANNEL 4 "C" |
|---|---|---|---|
| program for children of your age. How many fingers do you have? Push A if you think you have 7; push B for 10; or C for 15, now. | special program for children your age. How many fingers do you have? Push A if you think you have 7; push B for 10; or C for 15, now. | SCHOOL BY NOW! I HAVE A SPECIAL PROGRAM FOR YOU SCHOOL-AGE-CHILDREN, AND WE CAN BEGIN IT IF YOU PUSH THE QUESTION BUTTON, NOW. | SUME YOU MEANT TO TELL ME THAT YOU ARE 5 OR OLDER. I HAVE A SPECIAL PROGRAM FOR YOU SCHOOL-AGE CHILDREN, AND WE CAN BEGIN IT IF YOU PUSH THE QUESTION BUTTON, NOW. |
| SELECTION TIME OK. How many states are in the United States? Push A for 25; B for 46, or push C for 50, now! | SELECTION TIME Uh oh, only 7? I think you miscounted. The answer is 10. Please push the QUESTION button now! | SELECTION TIME That's right, 10 fingers! You found each and every one! Please push the QUESTION button now! | SELECTION TIME Uh oh, 15? You're wrong - the answer is 10. Let's continue. I want you to please push the QUESTION button, now! |
| SELECTION TIME Here is your next question, and it's special because I know you're 5 years old. Who is Mickey Mouse's girlfriend? Push A for Minnie, B for Lucy, or push C for Mabel, now! | SELECTION TIME OH NO. YOU THINK THERE ARE ONLY 25 STATES! ACTUALLY, THERE ARE 50. I THOUGHT YOU WOULD KNOW THAT SINCE YOU ARE 5 YEARS OLD OR OLDER. LET'S CONTINUE. PLEASE PUSH THE QUESTION BUTTON, NOW. | SELECTION TIME OH NO. YOU THINK THERE ARE ONLY 46 STATES? ACTUALLY, THERE ARE 50. I THOUGHT YOU WOULD KNOW THAT, SINCE YOU ARE 5 YEARS OLD OR OLDER. LET'S CONTINUE. PLEASE PUSH THE QUESTION BUTTON, NOW. | SELECTION TIME TERRIFIC! YOU KNOW THAT THERE ARE 50 STATES IN THE UNITED STATES! I'M SO GLAD FOR SURE YOU WOULD KNOW THAT, SINCE YOU ARE 5 YEARS OLD OR OLDER. GREAT JOB. LET'S CONTINUE. PLEASE PUSH THE QUESTION BUTTON, NOW. |
| SELECTION TIME I JUST LOVE ASKING YOU QUESTIONS! HERE'S ANOTHER: WHAT MAKES A RAINBOW? PUSH C IF YOU THE | SELECTION TIME Minnie is absolutely right! Here's another question: Where does milk come from? Push the | SELECTION TIME Lucy is wrong - it's Minnie! Here's another question: Where does milk come from? Push the | SELECTION TIME Mabel is wrong - it's Minnie! Here's another question: Where does milk come from? Push the |

-continued

EXAMPLE 2

| CHANNEL 1 "QUESTION" | CHANNEL 2 "A" | CHANNEL 3 "B" | CHANNEL 4 "C" |
|---|---|---|---|
| SKY AND THE MOON MAKE IT, OR PUSH D IF YOU THINK THE SUN AND RAIN MAKE RAINBOWS, NOW. | QUESTION button if you think it comes from a cow, or push A if it comes from a horse, now. | QUESTION button if you think it comes from a cow, or push A if it comes from a horse, now. | QUESTION button if you think it comes from a cow, or push A if it comes from a horse, now. |
| SELECTION TIME | SELECTION TIME | SELECTION TIME | SELECTION TIME |
| Wow! You know that milk comes from cows. You are very smart for someone who is younger than 5 years old . . . | Hee hee. Milk comes from horses? No silly, the milk we drink comes from cows. I'll forgive you, since you are not even 5 yet . . . | NO, NOT THE SKY AND THE MOON. SINCE YOU'RE 5 OR OLDER, YOU SHOULD KNOW THAT RAINBOWS ARE MADE BY THE SUN AND RAIN . . . | I'M SO HAPPY YOU KNOW THAT THE SUN AND RAIN MAKE RAINBOWS - BUT SINCE YOU'RE 5 OR OLDER, IT WAS A VERY EASY QUESTION FOR YOU TO ANSWER . . . |

This is made possible by properly timing and synchronizing the tracks of the tape. FIG. 3 shows a decision-tree corresponding with example 2. The program for each of the categories is alternated between the channels so that the program for children under 5, written in lower case, shares channel space with the program written for children 5 and over, written in upper case. Each program remains completely independent.

Since just one channel is necessary to maintain a memory of the child's age, the remaining channels may be used in different configurations. At level 2, the first channel, labeled "QUESTION" is reserved to recall the age of the children over 5 category, while the remaining channels are used to ask 3 response multiple choice questions. At level 4, two channels are reserved for each category, allowing simultaneous two answer questions to be given to children in each category. If desirable, 3 categories could be maintained on 4 channels, while still asking 2 answer multiple choice questions of the child.

Configured as in this example, the system exhibits a "vertical memory" throughout a program. At any time during the program, it is known if the child is under 5 years of age, or older than 5. By stating this fact at times throughout the program, the appearance is created that the toy exhibits memory. This method can be used to recall information on the child's sex, whether the child knows how to ride a bicycle, whether the child lives in the country, or any other information with 2 possible answers.

Figure 4:
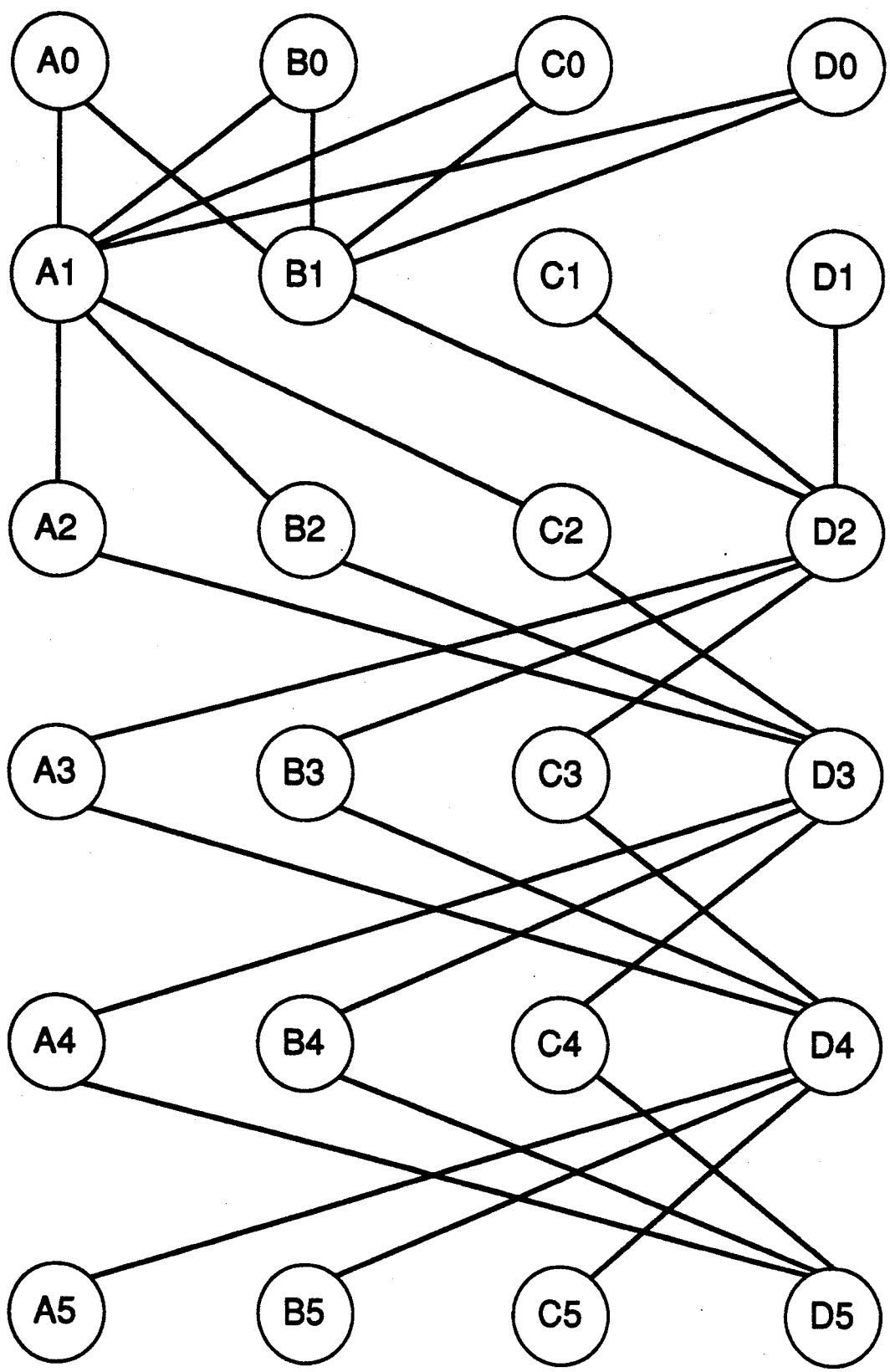
FIG. 4 is an illustration of the decision-tree corresponding with example 3.

As demonstrated in example 2, the questions can be tailored to the child's categorical information, or the same questions may be used when it is only desirable to create the impression of memory. If desired, at various times during the conversation, the content of the apparent memory may be changed. For example, the age memory used in example 2 may be changed to a gender memory (boy/girl) or any other such information, thereby simulating more complex conversation. Thus, the system may be used for profiling of children, wherein a conversation is created which contains a segment, segments or an entire program selectively geared to the specific information in the pseudo-memory. Since the information in the memory is changeable, the system may substitute additional or new information given by the child into the stream of conversation. Example 3 demonstrates use of the system of the present invention to provide memory, cumulative memory, time-alternating, profiling and substitutability. FIG. 4 shows the decision-tree corresponding with example 3.

EXAMPLE 3

| CHANNEL 1 "A" | CHANNEL 2 "B" | CHANNEL 3 "C" | CHANNEL 4 "D" |
|---|---|---|---|
| If you are a girl press A, a boy press B. | Same as Channel 1 | Same as Channel 1 | Same as Channel 1 |
| SELECTION TIME | SELECTION TIME | SELECTION TIME | SELECTION TIME |
| I see you indicated you are a girl. | I see you indicated you are a boy. | You are confused. I will assume you are a boy. | Same as Channel 3 |
| If you live in the country press A, suburbs press B or city press C. Press now. | Ok, little boy. I now have a question for you, but first I need you to press button D for me now. | Same as Channel 2 | Same as Channel 2 |
| SELECTION TIME | SELECTION TIME | SELECTION TIME | SELECTION TIME |
| Thank you. I now know you are a little girl who lives in the country (Specific information, songs, poems etc., for girl who lives in country) | Thank you. I now know you are a little girl who lives in the suburbs. (Same as Channel 1 but specific to girl who lives in suburbs) | Thank you. I now know you are a little girl who lives in a city. (Same as Channel 1 but specific to girl who lives in city) | Thanks little boy. Let's sing a song. (Filler) |
| OK little girl, that was fun. Please press a button for me. Press button D for me now | Same as Channel 1 | Same as Channel 1 | I now have a question for you. If you live in the country, press A, Suburbs B, or City press C now. |
| SELECTION TIME | SELECTION TIME | SELECTION TIME | SELECTION TIME |
| I now know you are a boy who lives in the country. (Specific material for boys who live in the country) Thank you. | I now know you are a boy who lives in the suburbs. (Specific material for boys who lives in suburbs) Same as | I now know you are a boy who lives in a city. (Specific material for boys who lives in city) Same as | Thank you little girl. (Specific material for girls) I would now like to know your age. If you are under 5 years old |

-continued

| EXAMPLE 3 | | | |
|---|---|---|---|
| CHANNEL 1 "A" | CHANNEL 2 "B" | CHANNEL 3 "C" | CHANNEL 4 "D" |
| That was fun - I hope you liked it. Press button D now. | Channel 1 | Channel 1 | press A, between 5 and 10 press B, over 10 press C. Press now. |
| SELECTION TIME | SELECTION TIME | SELECTION TIME | SELECTION TIME |
| I now know you are a girl under 5 years old. (Specific material for girl under 5 years old) | I now know you are a girl between 5 and 10 years old. (Specific material for girl between 5 and 10 years old) | I now know you are a girl over 10 years old. (Specific material for girl over 5 years old) | OK little boy. (Filler material for boys) I now have a question for you. I'd like to know your age. If you are under 5 years old press A. Between 5 and 10 press B. Over 10 years old press C. |
| I now need you to do something. Press button D now. | Same as Channel 1 | Same as Channel 1 | |
| SELECTION TIME | SELECTION TIME | SELECTION TIME | SELECTION TIME |
| I now know you are a boy who is under 5 years old. (Specific material for boys under 5 years old) ... | I now know you are a boy between 5 and 10 years old. (Specific material for boys between 5 and 10 years old) ... | I now know you are a boy over 10 years old. (Specific material for boys over 10 years old) ... | Thanks, little girl. (Specific material for girls) ... |

As shown in Example 4, the toy of the present invention may be used for a child to change the content of pre-recorded music in response to multiple choice responses. The music for the song exists on all four channels, but each channel has a different content, i.e. different musical instruments, different singer(s). As the song progresses, the child can select different channels at any time, thus altering who sings the song, or which instruments are played. All types of combinations are possible, and the mix of characters and instruments can change during the song. This technique can also be used for music alone where each channel may represent a different musical instrument, tempo, or beat.

| EXAMPLE 4 | | | |
|---|---|---|---|
| CHANNEL 1 "GREEN" | CHANNEL 2 "YELLOW" | CHANNEL 3 "RED" | CHANNEL 4 "BLUE" |
| Here is a song you will like. If you press the YELLOW button, a piano also plays along. Press RED and a trombone joins in | Same as Channel 1 | Same as Channel 1 | Same as Channel 1 |
| also. Press BLUE and Snoopy sings as well. (CONTINUOUS MUSIC PLAYS) | (CONTINUOUS MUSIC WITH PIANO) | (CONTINUOUS MUSIC WITH PIANO AND TROMBONE) | (CONTINUOUS MUSIC WITH PIANO, TROMBONE, AND SNOOPY) |
| Let's change everything. Now, if you press GREEN, the music will go faster. Push YELLOW, and big drums come in ... (etc.) | Same as Channel 1 | Same as Channel 1 | Same as Channel 1 |

In an alternative embodiment, the system may provide separate musical instruments or voice accompaniment to a particular piece of music on the various tracks of the media. In this configuration, the system would allow more than one multiple choice response to be selected at a particular time, the various selected channels being mixed to provide variations on the same piece of music. For example, if the channels A, B, C, and D contained piano, guitar, trombone and flute versions of the same music, if buttons A and C were depressed simultaneously, the music would be heard with piano and trombone only. If at any time during the music button B were depressed, the guitar music would be added to the output heard by the child. If button A were released, only guitar and trombone would be heard. Many different variations of this embodiment are foreseen.

If desired, the interactive toy of the present invention may include a book with a content corresponding with the content of the stored conversations. The book might include pictures, for which questions will be asked, and the labels on the keys might be altered to correspond with the selections in the book. Additionally, if video output is to be used in an embodiment of the present invention, the video display might correspond with the questions asked in the course of the conversation. If it were desired to use a touch screen, the screen display might include labels for the multiple choice selections at the locations of the multiple choice selection switches on the screen.

Although the present invention has been described in detail with respect to certain embodiments and examples, variations and modifications exist which are within the scope of the present invention as defined in the following claims.

What is claimed is:

1. A real-time interactive conversational toy comprising:
    a storage media; and means for selectively playing said storage media at a given time, said selectively playable storage media containing an interactive conversational content and comprising a plurality of temporally related data storage tracks containing information, said means for selectively playing said storage media at said given time comprising means for substantially simultaneously retrieving the information from each of said data storage tracks; and multiple choice selection means for randomly accessing one of said tracks of said storage media for retrieving the information stored thereon for enabling said selective playing of said retrieved information, the information being stored on each track in a plurality of information segments, each of said segments comprising a complete message reproducible by said retrieval means directly in response to the selection of the track upon which said segments are stored, each of said information segments comprising interrogatories having multiple choice selectable responses, responsive messages, informational messages, or combinations thereof related in real-time and content to information contained in at least one information segment of at least one track at a prior time, said information stored on said tracks in a predetermined timed sequence according to a decision-tree for providing a plurality of different interactive pathways through said tracks comprising a continuous flow of interactive conversations across said tracks dependent on said multiple choice selectable responses, each of at least one information segment on each of at least two of said plurality of tracks comprising an interrogatory having multiple choice selectable responses corresponding with associated information segments, said associated information segments comprising responsive messages related in real-time and content to said interrogatory, said correspondence determinable according to said decision tree, said selective playing means selectively playing an information segment from said accessed one of said tracks;

at least one of said interactive pathways provided by said decision tree comprising a special pathway accessible by said multiple choice selection means at a predetermined memory sampling point in said decision tree, said special pathway containing an information segment at said predetermined memory sampling point recalling a consecutive accumulation of the prior selections made along said special pathway at said memory sampling point for exhibiting a pseudo-memory of at least a portion of said multiple choice selectable responses along said at least one of said interactive pathways.

2. A real-time interactive conversational toy according to claim 1 wherein
the information on at least one of said data storage tracks comprises combinations of interrogatories and responsive messages.

3. A real-time interactive conversational toy according to claim 1 wherein
said plurality of different interactive pathways provided by said decision tree comprises at least a second independent special pathway accessible by said multiple choice selection means at said predetermined sampling point in said decision tree, said second independent special pathway existing simultaneously on said decision tree with said special pathway, said second independent special pathway containing an information segment at said predetermined memory sampling point recalling a consecutive accumulation of the prior selections made along said second independent special pathway at said memory sampling point for simultaneously exhibiting a pseudo-memory of at least a portion of said multiple choice selectable responses along said second independent special pathway.

4. A real-time interactive conversational toy according to claim 3, wherein
each special pathway exhibits recall of at least a portion of said multiple choice selectable responses after at least three consecutive interrogatories.

5. A real-time interactive conversational toy according to claim 1, wherein
said temporally related data storage tracks comprise a magnetic storage media having a plurality of coextensive tracks wherein said means for retrieving the information comprises magnetic storage media reading means corresponding with each of said plurality of coextensive tracks.

6. A real-time interactive conversational toy according to claim 1 further comprising means for removably receiving at least one of a plurality of storage media at a given time each of said plurality of removably receivable storage media containing a different interactive conversational content and comprising a plurality of said temporally related data storage tracks, said selective playing means selectively playing a removably received one of said plurality of storage media at said given time, said removably received one of said storage media comprising said plurality of different interactive pathways.

7. A method for providing a real-time interactive conversation which comprises
providing a magnetic storage media having plurality of coextensive audio tracks capable of having audio information stored thereon for audio playback therefrom;

providing a multi-track audio playback means for simultaneously obtaining said stored audio information from each of said coextensive tracks, said playback means capable of removably receiving a plurality of said storage media, each of said storage media containing a different interactive conversational content;

providing multiple choice selection means operatively connected to said playback means and controllable by a child for directly selecting one of said tracks for reproducing said selected information stored thereon;

providing audio output means operatively connected to said playback means and said direct selection means for reproducing said selected information on a selected track as an audio output therefrom;

storing said information on said tracks in a predetermined time sequence following a decision-tree relationship to allow a track invariant continuous flow of interactive conversation responsive to multiple choice selectable responses to interrogatories contained in said information, said multiple choice selectable responses corresponding with associated tracks, said decision-tree comprising at least one special pathway accessible by said multiple choice selection at a predetermined memory sampling point in said decision tree, along said special pathway said special pathway containing an information segment at said predetermined memory sampling point recalling a consecutive accumulation of the prior selections made along said special pathway at said memory sampling point for exhibiting a pseudo-memory of at least a portion of said particular multiple choice responses;

storing on said tracks in a timed relationship at least a plurality of interrogatories with respective multiple choice responses, said interrogatories and respective multiple choice responses related according to said decision tree to form said special pathway, the content of at least a portion of said related interrogatories each having a different content corresponding with the content of at least a portion of said memory of multiple choice responses;

playing back said magnetic storage media, said audio output means reproducing the information on tracks associated with the multiple choice responses to said interrogatories, said playback means providing interactive conversation and exhibiting said pseudo-memory in response to multiple choice selections corresponding to said series of particular responses associated with said at least one special pathway.

8. A method for providing a real-time interactive conversation which comprises:

providing a digital storage media having audio information stored thereon for audio playback therefrom, said stored information being stored in a plurality of audio files, each of said files representing an audio track;

providing audio playback means for obtaining said stored audio information from each of said tracks, said playback means capable of receiving a plurality of said storage media, each of said storage media containing a different interactive conversational content;

providing multiple choice selection means operatively connected to said playback means and controllable by a child for directly selecting one of said tracks for reproducing said selected information stored thereon;

providing audio output means operatively connected to said playback means and said direct selection means for reproducing said selected information on a selected track as an audio output therefrom;

storing said information on said tracks in a predetermined time sequence following a decision-tree relationship to allow a track invariant continuous flow of interactive conversation responsive to multiple choice selectable responses to interrogatories contained in said information, said multiple choice selectable responses corresponding with associated tracks, said decision-tree comprising at least one special pathway accessible by said multiple choice selections at a predetermined memory sampling point in said decision tree, along said special pathway said special pathway containing an information segment at said predetermined memory sampling point recalling a consecutive accumulation of the prior selections made along said special pathway at said memory sampling point for exhibiting a pseudo-memory of at least a portion of said particular multiple choice responses;

storing on said tracks in a timed relationship at least a plurality of interrogatories with respective multiple choice responses, said interrogatories and respective multiple choice responses related according to said decision tree to form said special pathway, the content of at least a portion of said related interrogatories each having a different content corresponding with the content of at least a portion of said memory of multiple choice responses;

playing back said digital storage media, said audio output means reproducing the information on tracks associated with the multiple choice responses to said interrogatories, said playback means providing interactive conversation and exhibiting said pseudo-memory in response to multiple choice selections corresponding to said series of particular responses associated with said at least one special pathway.

* * * * *

UNITED STATES PATENT AND TRADEMARK OFFICE
CERTIFICATE OF CORRECTION

PATENT NO. : 5,213,510
DATED : 5-25-93
INVENTOR(S) : Michael J. Freeman

It is certified that error appears in the above-indentified patent and that said Letters Patent is hereby corrected as shown below:

Column 19, line 10: Delete "different" and insert --differing--.

Column 20, line 29: Delete "different" and insert--differing--.

Signed and Sealed this

Twentieth Day of September, 1994

Attest:

BRUCE LEHMAN

Attesting Officer

Commissioner of Patents and Trademarks